United States Patent
Fan et al.

(10) Patent No.: US 9,357,662 B2
(45) Date of Patent: May 31, 2016

(54) DISPLAY, BACKLIGHT MODULE, AND FRAME STRUCTURE THEREOF

(71) Applicant: AU Optronics Corporation, Hsin-Chu (TW)

(72) Inventors: Chih-Shun Fan, Hsin-Chu (TW); Meng-Cheng Chu, Hsin-Chu (TW); Yung-Chih Liu, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 14/045,866

(22) Filed: Oct. 4, 2013

(65) Prior Publication Data

US 2014/0098514 A1    Apr. 10, 2014

(30) Foreign Application Priority Data

Oct. 9, 2012    (TW) .............................. 101137293 A

(51) Int. Cl.
*F21V 9/14* (2006.01)
*H05K 5/00* (2006.01)
(Continued)

(52) U.S. Cl.
CPC ................ *H05K 5/0017* (2013.01); *F21V 9/14* (2013.01); *G02B 6/0011* (2013.01); *G02B 6/0088* (2013.01); *G02F 2001/133317* (2013.01)

(58) Field of Classification Search
CPC .. G02B 6/0053; G02B 6/0038; G02B 6/0061; G02B 6/0016; G02B 6/002; G02B 6/0068; G02B 6/0088; G02F 1/133608; G02F 1/113604
USPC .......................................... 362/621.618, 633
See application file for complete search history.

(56) References Cited

U.S. PATENT DOCUMENTS

| | | | |
|---|---|---|---|
| 7,027,112 B2 * | 4/2006 | Wang et al. | 349/58 |
| 7,416,309 B2 * | 8/2008 | Ko et al. | 362/19 |
| 8,297,823 B2 * | 10/2012 | Cho et al. | 362/606 |

(Continued)

FOREIGN PATENT DOCUMENTS

| | | |
|---|---|---|
| CN | 1900791 A | 1/2007 |
| JP | 2000267591 A | 9/2000 |

OTHER PUBLICATIONS

China Office Action dated Jul. 14, 2014.

(Continued)

*Primary Examiner* — Jong-Suk (James) Lee
*Assistant Examiner* — Mark Tsidulko
(74) *Attorney, Agent, or Firm* — McClure, Qualey & Rodack, LLP

(57) ABSTRACT

A backlight module includes a light-guiding plate, a backlight source disposed at a side of the light-guiding plate, and a frame structure disposed surrounding the light-guiding plate. The frame structure includes a border component, at least one first convex, and at least one second convex. The border component includes at least one first border and at least one second border. The first border and the second border are adjacent to each other and distributed along a first direction and a second direction respectively. The first convex protrudes from the inner surface of the first border and extends inward along the second direction. The second convex protrudes from the inner surface of the second border and extends inward along the first direction. The first direction is vertical to the second direction, and the top of the vertical height of the first convex is lower than that of the second convex.

7 Claims, 4 Drawing Sheets

(51) Int. Cl.
  *F21V 8/00* (2006.01)
  *G02F 1/1333* (2006.01)

(56) References Cited

U.S. PATENT DOCUMENTS 8,757,861 B2 * 6/2014 Kim .............................. 362/633
8,807,820 B2 * 8/2014 Noh et al. .................... 362/632
8,905,617 B2 * 12/2014 Jeong et al. .................. 362/633
2007/0019127 A1   1/2007 Oohira
2007/0030700 A1 * 2/2007 Pan .............................. 362/633
2007/0046859 A1   3/2007 Huang et al.
2010/0265425 A1  10/2010 Kawaguchi et al.

OTHER PUBLICATIONS

Office Action issued in corresponding China application (dated May 21, 2015).
China Office Action dated Dec. 29, 2014.

* cited by examiner

DISPLAY, BACKLIGHT MODULE, AND FRAME STRUCTURE THEREOF

BACKGROUND OF THE INVENTION

1. Field of the Invention

The invention relates to a liquid crystal display; in particular, to a display, a backlight module, and a frame structure thereof which can reduce width and thickness simultaneously.

2. Description of the Prior Art

In recent years, with the continuous progress of technology, hand-held electronic apparatuses, such as smart phone, personal digital assistant (PDA), and tablet PC, are widely used. For consumers to easily hold and carry the hand-held electronic apparatus, the designer try to further reduce width and thickness of the hand-held electronic apparatus to meet the needs of consumers.

In general, the liquid crystal display (LCD) is used as display of the hand-held electronic apparatus; therefore, if the designer wants to meet the consumer's need of reducing the width and thickness of the hand-held electronic apparatus, the designer has to adjust the inner structure design of the LCD used in the hand-held electronic apparatus. For example, non-sunken design or sunken design can be used as the inner structure of the LCD.

However, no matter it is the non-sunken design or the sunken design used as the inner structure of the LCD in the hand-held electronic apparatus, only the width or the thickness of the hand-held electronic apparatus can be reduced. It still fails to reduce the width and the thickness of the hand-held electronic apparatus simultaneously; therefore, it fails to meet the needs of consumers.

In addition, when the sunk design is used as the inner structure of the LCD in the hand-held electronic apparatus, because the width of the tape above the backlight module adhering to the display panel is quite small, the adhesion force provided by the tape is too weak to prevent the backlight module from being apart from the display panel or lower polarizer. This situation needs to be improved.

SUMMARY OF THE INVENTION

A scope of the invention is to provide a display, a backlight module, and a frame structure thereof to solve the above-mentioned problems occurred in the prior arts.

An embodiment of the invention is a backlight module. The backlight module includes a light-guiding plate, a back-light source, and a frame structure. The back-light source is disposed at a side of the light-guiding plate. The frame structure is disposed surrounding the light-guiding plate. The frame structure includes a border component, at least one first convex, and at least one second convex. The border component includes at least one first border and at least one second border. The first border and the second border are adjacent to each other and distributed along a first direction and a second direction respectively. The first convex protrudes from the inner surface of the first border and extends inward along the second direction. The second convex protrudes from the inner surface of the second border and extends inward along the first direction. The first direction is vertical to the second direction, and a first top of a first vertical height of the first convex is lower than a second top of a second vertical height of the second convex.

In an embodiment of the invention, the light-guiding plate is disposed adjacent to the second convex in the first direction and disposed adjacent to the first convex in the second direction.

In an embodiment of the invention, the back-light source is disposed between the second convex and the light-guiding plate in the first direction.

In an embodiment of the invention, a first thickness of the first convex is smaller than a second thickness of the second convex.

In an embodiment of the invention, the first border is connected to the second border and the first convex on the first border is connected to the second convex on the second border, and a ladder-like structure is formed by the first convex and the second convex.

Another embodiment of the invention is a frame structure used for a display. The frame structure includes a border component, at least one first convex, and at least one second convex. The border component includes at least one first border and at least one second border. The first border and the second border are adjacent to each other and distributed along a first direction and a second direction respectively. The first convex protrudes from the inner surface of the first border and extends inward along the second direction. The second convex protrudes from the inner surface of the second border and extends inward along the first direction. The first direction is vertical to the second direction, and a first top of a first vertical height of the first convex is lower than a second top of a second vertical height of the second convex.

Another embodiment of the invention is a display. The display includes a display panel, an optical film, and a backlight module. The backlight module includes a light-guiding plate, a back-light source, and a frame structure. The optical film is disposed on the backlight module and the display panel is disposed on the optical film. The frame structure includes a border component, at least one first convex, and at least one second convex. The border component includes at least one first border and at least one second border. The first border and the second border are adjacent to each other and distributed along a first direction and a second direction respectively. The first convex protrudes from the inner surface of the first border and extends inward along the second direction. The second convex protrudes from the inner surface of the second border and extends inward along the first direction. The first direction is vertical to the second direction, and a first top of a first vertical height of the first convex is lower than a second top of a second vertical height of the second convex.

The advantage and spirit of the invention may be understood by the following detailed descriptions together with the appended drawings.

BRIEF DESCRIPTION OF THE APPENDED DRAWINGS

DETAILED DESCRIPTION OF THE INVENTION

A preferred embodiment of the invention is a display. In this embodiment, the display is a liquid crystal display and used in the hand-held electronic apparatus, such as a mobile phone, a personal digital assistant, or a tablet PC, but not limited to this.

Figure 1:
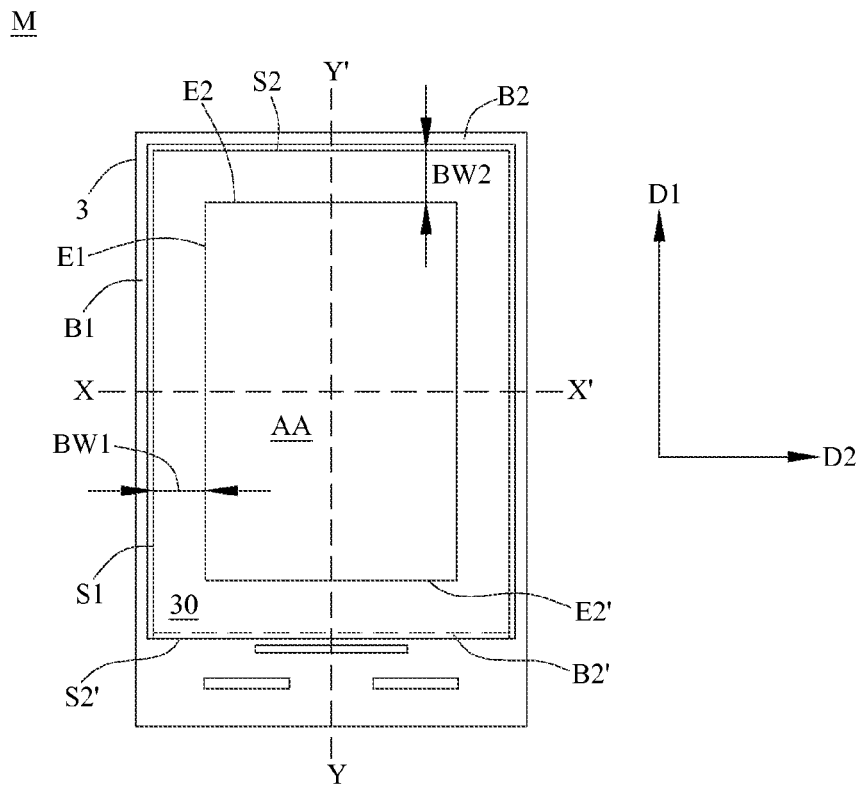
FIG. 1 illustrates a top view of the hand-held electronic apparatus in a preferred embodiment of the invention.
Figure 2:
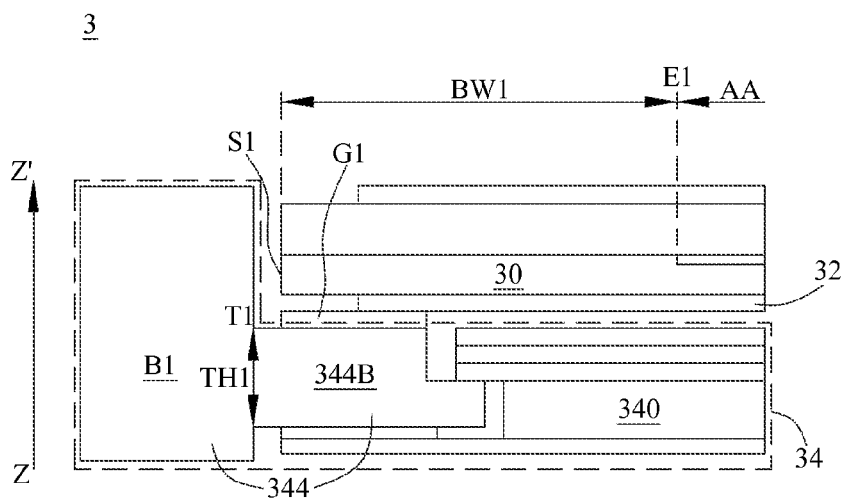
FIG. 2 illustrates a cross-sectional view of the hand-held electronic apparatus of FIG. 1 along a horizontal X-X' direction.
Figure 3:
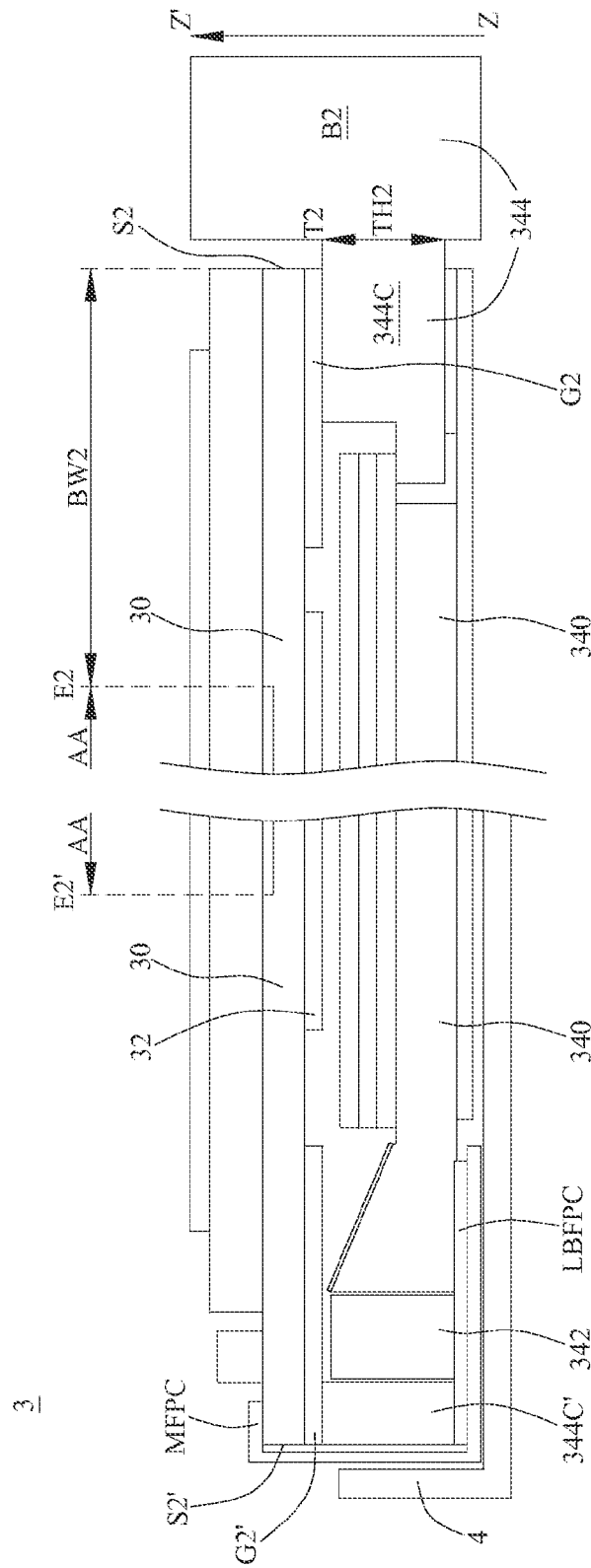
FIG. 3 illustrates a cross-sectional view of the hand-held electronic apparatus of FIG. 1 along a vertical Y-Y' direction.

Please refer to FIG. 1. FIG. 1 illustrates a top view of the hand-held electronic apparatus in this embodiment of the invention. As shown in FIG. 1, the hand-held electronic apparatus M includes a display 3. Please also refer to FIG. 2 and FIG. 3. FIG. 2 illustrates a cross-sectional view of the hand-held electronic apparatus M of FIG. 1 along a horizontal X-X' direction; FIG. 3 illustrates a cross-sectional view of the hand-held electronic apparatus M of FIG. 1 along a vertical Y-Y' direction.

It should be noticed that most users hold the right side and the left side of the hand-held electronic apparatus M (namely the horizontal X-X' direction); therefore, in order to easily hold the hand-held electronic apparatus M, the users will have stronger demand for narrow frame in the horizontal X-X' direction, and the design of the display 3 in the horizontal X-X' direction is made to reduce the width of the hand-held electronic apparatus M. As to the upper side and the lower side of the hand-held electronic apparatus M (namely the vertical Y-Y' direction), because the user seldom hold there, the design of the display 3 in the vertical Y-Y' direction is only to reduce the thickness of the hand-held electronic apparatus M, and it is unnecessary to narrow the frame in the vertical Y-Y' direction.

As shown in FIG. 2 and FIG. 3, the display 3 includes a display panel 30, an optical film 32, and a backlight module 34. For example, the display panel 30 can be a liquid crystal display panel, and the optical film 32 can be a polarizer, but not limited to this. The backlight module 34 includes a light-guiding plate 340, a back-light source 342, and a frame structure 344. The frame structure 344 disposed surrounding the light-guiding plate 340. The light-guiding plate 340 is disposed adjacent to the back-light source 342; the back-light source 342 is used to emit a light into the light-guiding plate 340, and the light-guiding plate 340 will guide the light and upwardly emit the light to the display panel 30. In this embodiment, the plastic frame is used as the frame structure 344, but not limited to this.

In this embodiment, the frame structure 344 includes at least one first border B1 (as shown in FIG. 1 and FIG. 2), at least one second borders B2 and B2' (as shown in FIG. 1 and FIG. 3), at least one first convex 344B (as shown in FIG. 2), and at least one second convex 344C (as shown in FIG. 3). As understood by persons skilled in the art, "convex" means extending outward or bulging, and may be a curved or non-curved surface. The at least one first border B1 shown in FIG. 2 and the at least one second borders B2 and B2' shown in FIG. 3 can be collectively referred to as the border component B. As shown in FIG. 1, the first border B1 and the second borders B2 and B2' are adjacent to each other and distributed along the vertical Y-Y' direction (a first direction D1) and the horizontal X-X' direction a second direction D2) respectively. It should be noticed that the second borders B2 and B2' at two sides respectively in FIG. 3 have different frame structures. This is because the backlight source 342 is disposed on the second border B2', the second convex 344C' should be shrunk to provide a space to dispose the backlight source 342; for example, a groove can be formed or a part of the second convex 344C' can be removed to reduce the width of the second convex 344C' in the vertical Y-Y' direction. In this embodiment, the main flexible printed circuit MFPC is electrically connected with the light bar flexible printed circuit LBFPC of the backlight module 34 and the light bar flexible printed circuit LBFPC is bent and protruding out of the backlight module 34 to electrically connect with the display panel 30. In order to avoid the interference between the frame structure 344 and the light bar flexible printed circuit LBFPC, the part of the second border B2' protruding out of the second convex 344C' in the horizontal X-X' direction will be removed. In other embodiments, in order to reduce the thickness of the hand-held electronic apparatus M, the part of the second border B2 protruding out of the second convex 344C in the horizontal X-X' direction and the part of the first border B1 protruding out of the first convex 344B in the vertical Y-Y' direction will be both removed. The first side S1 of the display panel 30 (as shown in FIG. 1 and FIG. 2) is adjacent to the first border B1; the second side S2 of the display panel 30 (as shown in FIG. 1 and FIG. 3) is adjacent to the second borders B2, and the second side S2' is adjacent to the second border B2' (as shown in FIG. 1 and FIG. 3). The display panel 30 includes an active area AA, and a first edge E1 (as shown in FIG. 1 and FIG. 2) and a second edge E2 (as shown in FIG. 1 and FIG. 3) of the active area AA are adjacent to the first border B1 and the second border B2 respectively, and the second edge E2' is adjacent to the second border B2' (as shown in FIG. 1 and FIG. 3).

The light-guiding plate 340 is disposed adjacent to the second convex 344C in the vertical Y-Y' direction, and disposed adjacent to the first convex 344B in the horizontal X-X' direction. The backlight source 342 is disposed between the second border B2' and the light-guiding plate 340 in the vertical Y-Y' direction. The second border B2' is disposed at another side of the backlight source 342 and the another side is opposite to the light emitting surface of the backlight source 342. A second tape layer G2' is disposed above the second border B2' and the second tape layer G2' is adhered under the display panel 30 to provide adhesion force to adhere the second border B2' and the display panel 30 together. The side of the second border B2' away from the backlight source 342 is aligned with the second side S2' of the display panel 30 above at least for narrow down the border.

As shown in FIG. 2 and FIG. 3, the frame structure 344 is disposed surrounding the light-guiding plate 340. The frame structure comprising a border component B, comprising the first border B1 and the second border B2 of the display 3. The inner surface of the first border B1 surrounds the light-guiding plate 340. The first border B1 of the display 3 in FIG. 2 has at least one first convex 344B protruding from the inner surface of the first border B1 and extending inward along the horizontal X-X' direction and disposed under the optical film 32; the second border B2 of the display 3 in FIG. 3 has at least one second convex 344C protruding from the inner surface of the second border B2 and extending inward along the vertical Y-Y' direction and disposed under the display panel 30. In this embodiment, since the user seldom hold the vertical Y-Y' direction of the hand-held electronic apparatus M, it is unnecessary to narrow the frame structure 344 in the vertical Y-Y' direction; since the user usually holds the horizontal X-X' direction of the hand-held electronic apparatus M, the frame structure 344 should be narrowed in the horizontal X-X' direction. Therefore, the distance BW1 (namely the width of the horizontal frame of the display 3) between the first side S1 of the display panel 30 and the first edge E1 of the active area AA in FIG. 2 will be reduced to be smaller than the distance BW2 (namely the width of the vertical frame of the display 3) between the second side S2 of the display panel 30 and the second edge E2 of the active area AA in FIG. 3. It should be noticed that because the current trend of the hand-held electronic apparatus is to design it in a easy-holding state in the horizontal X-X' direction, the first border B1 of the display 3 in this embodiment has at least one first convex 344B protruding from the inner surface of the first border B1 and extending inward along the horizontal X-X' direction and disposed under the optical film 32, and the second border B2 of the display 3 has at least one second convex 344C protruding from the inner surface of the second border B2 and extending inward along the vertical Y-Y' direction and disposed under the display panel 30, and the distance BW1 is smaller than the distance BW2. However, it is not limited to this, if the holding direction of the hand-held electronic apparatus is changed, the relative relationship between the distance BW1 and the distance BW2 will be also changed, and other types of design can be also used, and distance BW1 can be also larger than or equal to the distance BW2.

Figure 4:
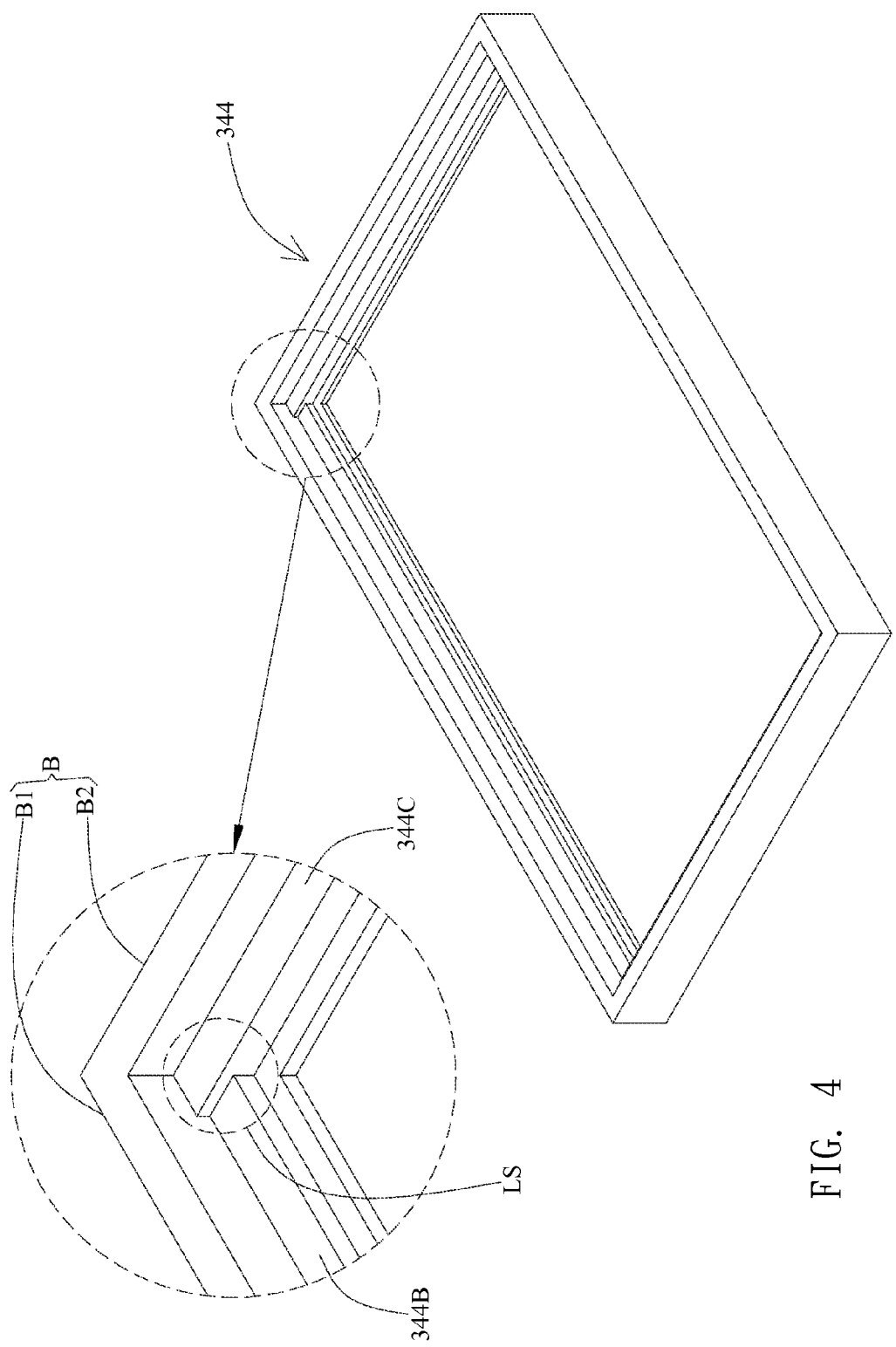
FIG. 4 illustrates a ladder-like structure formed by connecting the first convex and the second convex having different heights in the frame structure.
Figure 5:
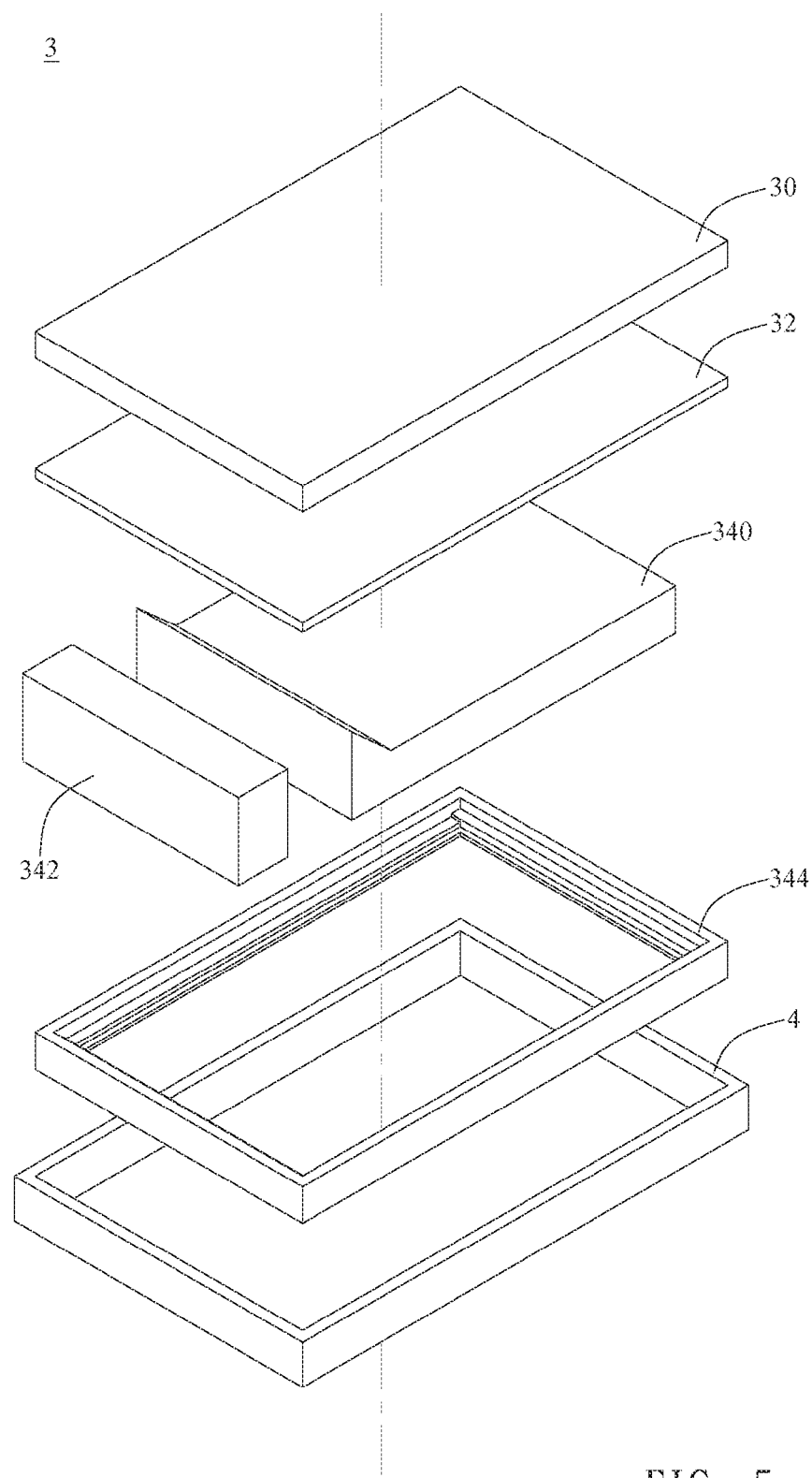
FIG. 5 illustrates exploded diagrams of the case, the display panel, the optical film, the light-guiding plate, the backlight source, and the frame structure in the display.

In this embodiment, the first tape layer G1 is disposed on the first convex 344B to adhere the first convex 344B and the optical film 32 together, and the second tape layer G2 is disposed on the second convex 344C to adhere the bottom surface of the display panel 30 to adhere the second convex 344C and the display panel 30 together. Therefore, the first top T1 of the vertical height of the first convex 344B will be lower than the second top T2 of the vertical height of the second convex 344C to form the ladder design, and the first thickness TH1 of the first convex 344B in the Z-Z' direction will be smaller than the second thickness TH2 of the second convex 344C in the Z-Z' direction. Therefore, as shown in FIG. 4, in the border component B, if the first convex 344B on the first border B1 is connected to the second convex 344C on the second border B2, a ladder-like structure LS in a corner of the border component B will be formed by the first convex 344B and the second convex 344C having different heights, but not limited to this. FIG. 5 illustrates exploded diagrams of the case 4, the display panel 30, the optical film 32, the light-guiding plate 340, the back-light source 342, and the frame structure 344 in the display 3.

As shown in FIG. 2, the first border B1 of the display 3 has at least one first convex 344B protruding from the inner surface of the first border B1 and extending inward along the horizontal X-X' direction and disposed under the optical film 32; the first tape layer G1 disposed on the first convex 344B will adhere to the bottom of the optical film 32 to provide enough adhesion force to adhere the first convex 344B of the frame structure 344 and the optical film 32 together, the situation that the backlight module and the optical film are separated to each other in the prior art can be effectively avoided. With the above-mentioned design in the horizontal X-X' direction, the horizontal frame width BW1 can be reduced and the width of the first tape layer G1 adhering to the optical film 32 is not increased. Therefore, it can provide enough adhesion force to adhere the first convex 344B of the frame structure 344 and the optical film 32 together and the reduced horizontal frame width BW1 is convenient for the user to hold.

As shown in FIG. 3, the second border B2 of the display 3 in the vertical Y-Y' direction has at least one second convex 344C protruding from the inner surface of the second border B2 and extending inward along the vertical Y-Y' direction and disposed under the display panel 30. Since two ends of the optical film 32 in this direction are retracted toward the active area AA, the optical film 32 and the second border B2 will be not overlapped to reduce the thickness of the display 3. Therefore, with the above-mentioned design in the vertical Y-Y' direction, the distance BW1 is smaller than the distance BW2, the second tape layer G2 disposed on the second convex 344C can have enough width to adhere to the bottom of the display 30 to provide enough adhesion force to adhere the second convex 344C of the frame structure 344 and the display 30 together, the situation that the backlight module and the optical film are separated to each other in the prior art can be effectively avoided.

Similarly, as shown in FIG. 3, the narrow frame design is unnecessary for the second border B2 of the display 3 in the vertical Y-Y' direction, even the vertical frame width BW2 is larger than the horizontal frame width BW1, since the user rarely holds there, it actually has little effect on the user. Since two ends of the optical film 32 in this direction are retracted toward the active area AA, the optical film 32 and the second border B2 will be not overlapped to reduce the thickness of the display 3. Since the adhering area in the vertical Y-Y' direction is larger than that in the horizontal X-X' direction, and the width of the second tape layer G2 adhering to the display panel 30 is also larger than the width of the first tape layer G1 adhering to the optical film 32 at the same condition; therefore, it can provide enough adhesion force to adhere the second convex 344C of the frame structure 344 and the display panel 30 together.

Another two embodiments of the invention are a backlight module and a frame structure respectively. Since the backlight module and the frame structure of the invention have been described in detail in the above-mentioned embodiments, they are not repeated here.

Compared to the prior art, in the frame structure of the backlight module of the display according to the invention, the first border in the horizontal direction has at least one first convex protruding from the inner surface of the first border and extending inward along the horizontal direction and disposed under the optical film; therefore, the width between the right side and the left side of the display will become narrower for the user to hold more easily. In addition, because the second border of the display in the vertical direction has at least one second convex protruding from the inner surface of the second border and extending inward along the vertical direction and disposed under the display panel; therefore, the width of the tape disposed on the backlight module adhering to the display panel or optical film is large enough to provide adequate adhesion force. Therefore, the display, the backlight module, and the frame structure thereof according to the invention can reduce the entire width and thickness of the hand-held electronic apparatus simultaneously, and the situation that the backlight module and the display panel or the optical film are separated to each other in the prior art can be effectively avoided.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:
1. A display, comprising:
a display panel;
an optical film comprising a polarizer; and
a backlight module, comprising a frame structure, the optical film being disposed on the backlight module and the display panel being disposed on the optical film, the frame structure comprising:

a border component, comprising at least one first border and at least one second border, wherein the first border and the second border are adjacent to each other and the first border and the second border are distributed along a first direction and a second direction respectively;

at least one first convex, protruding from the inner surface of the first border and extending inward along the second direction;

at least one second convex, protruding from the inner surface of the second border and extending inward along the first direction, and the second convex not overlapping with the optical film;

a first tape layer, disposed between and in direct contact with the first convex and the optical film; and a second tape layer, disposed between the second convex and the display panel;

wherein the first direction and the second direction are two mutually perpendicular directions in a horizontal plane, and top of a first vertical height of the first convex is lower than top of vertical height of the second convex, the first border is connected to the second border and the first convex on the first border is connected to the second convex on the second border, and a ladder-like structure in a corner of the border component is formed by the first convex and the second convex.

2. The display of claim 1, wherein the display panel comprises:

at least one first side, adjacent to the first border;

at least one second side, adjacent to the second border; and an active area, comprising:

at least one first edge, adjacent to the first border; and at least one second edge, adjacent to the second border.

3. The display of claim 2, wherein a distance between the first side and the first edge is smaller than a distance between the second side and the second edge.

4. The display of claim 2, wherein a distance between the first side and the first edge is equal to a distance between the second side and the second edge.

5. The display of claim 1, wherein a thickness of the first convex is smaller than a thickness of the second convex.

6. The display of claim 1, wherein the backlight module further comprises a light-guiding plate disposed adjacent to the second convex in the first direction and disposed adjacent to the first convex in the second direction.

7. The display of claim 1, wherein the backlight module further comprises a back-light source disposed between the second convex and the light-guiding plate in the first direction.

* * * * *